Oct. 8, 1935.    G. C. WARD, JR    2,016,880
ROTARY SPRAY MECHANISM FOR DISHWASHERS
Filed Feb. 1, 1932
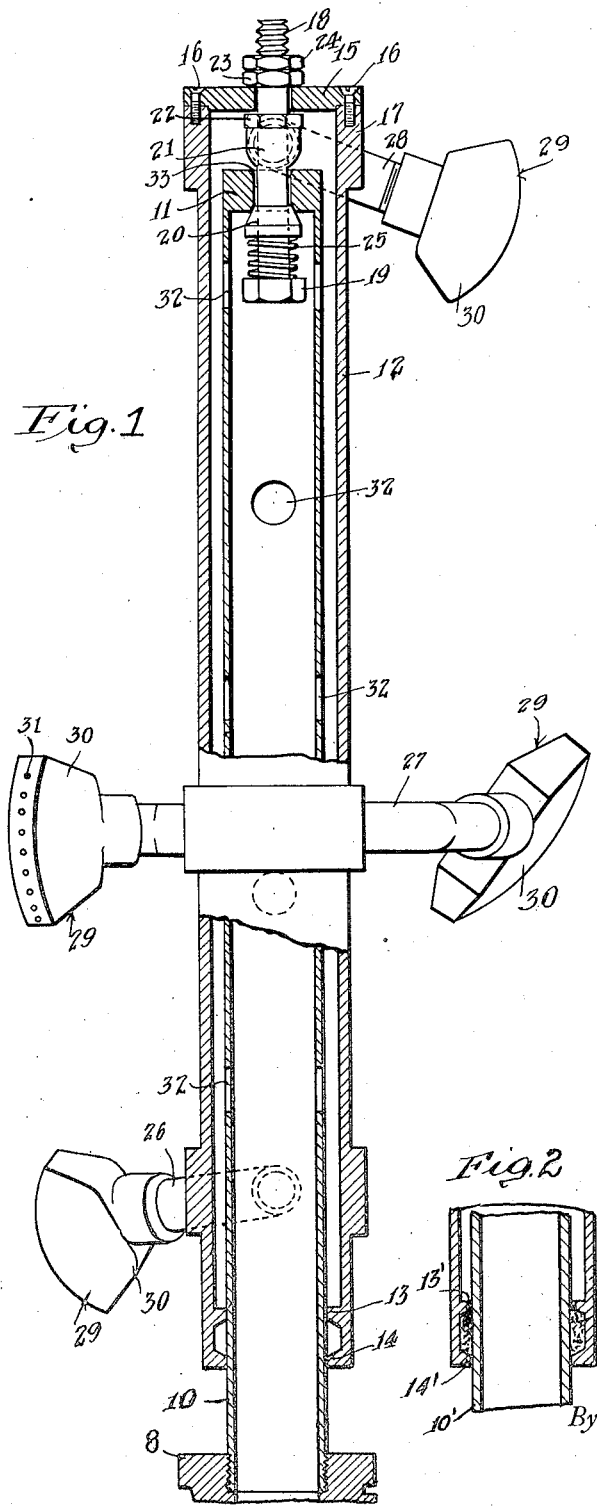
Inventor
George Chester Ward Jr.
By Lyon & Lyon
Attorneys Patented Oct. 8, 1935

2,016,880

UNITED STATES PATENT OFFICE 2,016,880

ROTARY SPRAY MECHANISM FOR DISHWASHERS

George Chester Ward, Jr., Ventura, Calif., assignor to Economy Products, Inc., Los Angeles, Calif., a corporation of Arizona Application February 1, 1932, Serial No. 590,130

5 Claims. (Cl. 299—69)

This invention relates to self-rotating spray mechanism for dish washing appliances, and has as a broad object the provision of an efficient spray mechanism that can be produced at low cost.

In accordance with the present invention, I provide a spray consisting of a rotatable hollow column member having nozzle arms radiating therefrom and mounted upon a stationary spindle through which water is supplied to the rotatable member, with a special bearing mechanism for supporting the rotatable member on the spindle for free movement with minimum friction. Some of the arms are longer than the others and have nozzles thereon which are directed rearwardly (with respect to the direction of rotation) so that they supply the power to rotate the unit, and the other shorter arms have their nozzles directed forwardly to deliver water at high velocity to the dishes, the water at the points of impact on the dishes having a very high velocity by virtue of the velocity of rotation of the spray structure as a unit, which velocity of rotation is in turn high by virtue of the low frictional resistance to rotation of the unit.

A full understanding of the invention may be had from the following description, when read in connection with the accompanying drawing, in which Figure 1 is a sectional elevational detail view of my rotary spray mechanism.

Figure 2 is a detail sectional view of a modification of the lower bearing structure.

Referring to Figure 1, a vertical pipe 10 which may be threaded into base member 8, extends upwardly and is partly closed at its upper end by an apertured plug 11. This vertical pipe 10 serves as a standard about which an outer column 12, carrying spray nozzles, rotates.

The outer column 12 is larger in inside diameter throughout its length than the outer diameter of the pipe 10 to provide ample space for water to flow therebetween. At its lower end, however, the column 12 is provided with two inwardly extending shoulders 13 and 14 which form a free running fit about the pipe 10. The upper end of column 12 is closed by a cap 15 which may be secured to the column 12 by screws 16, as shown, or by welding or brazing. A reinforcing band 17 has been shown about the upper end of column 12 to reinforce it at the point of attachment to the cap 15 and to supply the necessary thickness to take threads for arm 28.

The channel formed between shoulders 13 and 14 forms an air lock which greatly reduces the total amount of water leaking between the pipe and column at this point.

To secure the outer column 12 in proper position vertically with respect to the pipe 10, there is provided an upper bearing assembly comprising a bolt 18 having a head 19 at its lower end upon which are mounted a lower conical bearing 20 and an upper conical bearing 21. The bolt 18 is secured in fixed relation to the cap 15 by nuts 22 and 23, a locknut 24 being tightened against nut 23 to prevent it from loosening. The upper cone 21 is threaded onto bolt 18 and is locked firmly with respect thereto by being screwed tightly up against nut 22. The lower cone 20, on the other hand, fits loosely on the lower end of bolt 18, which is not threaded at this point, and is resiliently supported in spaced relation from the head 19 by a spring 25. Bearing plug 11, through which the bolt 18 passes, is provided with an aperture somewhat larger than the bolt and the bolt is so adjusted with respect to cap 15 that a slight amount of play is provided between either cone 20 or 21 and the face of the bearing plug 11 against which it seats.

The outer column 12 is provided with a plurality of radially projecting arms 26, 27 and 28, the upper arms 28 projecting from the column much further than the lower arms 26 and 27. Nozzles 29 are provided on the end of each radial arm. These nozzles each consist of a fan-shaped block 30 provided with a single row of holes 31 which produce a fan-shaped spray. Each block 30 is provided with screw threads at its base for connection to the outer ends of the arms 26, 27 and 28, which are also threaded. In order to provide a desired adjustability, the blocks 30 are not symmetrical but extend vertically a greater distance to one side of the arm to which they are attached than the other side. Thus, referring to the arm 27 on the left side of Figure 1, the block 30 projects down below the axis of arm 27 further than it does above. This results in the spray from this nozzle being directed through an arc that extends a greater distance below the horizontal plane of arm 27 than above. On the other hand, the nozzle 29 on the arm 27, opposite to that just discussed, may be set so that it directs the spray above the axis of arm 27 to a greater extent than below it. With this offset or unsymmetrical construction of nozzles 29, the two nozzles in each pair of opposite arms may be adjusted to cover a greater vertical area than if each nozzle discharged a fan-shaped jet the axis of symmetry of which extended horizontally.

The ends of the upper arms 28 are directed tangentially in a clockwise direction, whereas the outer ends of the lower arms 26 and 27 are directed tangentially in a counter-clockwise direction. As is well known, when fluid is discharged from a nozzle the reaction of the fluid tends to force the nozzle in the opposite direction. Therefore, when water is directed tangentially from the ends of the radial arms, as shown, the discharge tends to rotate the arm in the opposite direction. Because of the fact that the upper arms 28 extend much further from the axis of rotation than do the lower arms 26 and 27, the column 12, together with the entire assembly of arms and nozzles, will be rotated in a counter-clockwise direction by the torque resulting from the reaction of the jets of water issuing from the nozzles on the ends of arms 28.

In the device described, when water is applied to the central pipe 10 it passes up through pipe 10 and out through the holes 32 therein to the space between the pipe 10, and column 12. This water being under considerable pressure, some of it escapes by flowing down around the pipe 10 past the lower shoulders 13 and 14 on the outer column 12. The amount of water thus escaping is not very great, but it serves a very useful function in that it prevents contact between the shoulders 13 and 14 and the pipe 10, and thus provides a floating lateral support at this point for the column 12. When no water is being supplied to pipe 10, the entire weight of the outer column and spray nozzle assembly is supported from block 11, the upper conical seat of which supports the upper cone 21 which is rigidly attached to the outer column 12 through the cap 15. However, when water is admitted to the column, sufficient pressure is developed against the lower side of cap 15 to carry the weight of the column and assembly so that the upper cone 21 is lifted slightly above the seat 33. Since it is not practical to always so regulate the water pressure within the outer column 12 as to produce just sufficient reaction against cap 15 to support the weight of the assembly, the lower cone 20, which is resiliently supported from the bolt head 19 by spring 25, is provided to insure that the outer column assembly, including bolt 18, will not rise too high with respect to the cap 11 and the inner column.

It will be observed that as a result of the construction described, when water is admitted under pressure to the pipe 10, the weight of the outer column assembly is supported substantially entirely by the water pressure acting against cap 15 and that the outer column is restrained against radial motion with respect to the pipe 10 by the water-lubricated bearings at the top and bottom thereof. Since water is constantly forced past these bearings constituted by shoulders 13 and 14 at the bottom of column 12 and by the apertured block 11 at the top thereof, the entire outer assembly is literally floated on water so that it has no solid connection with the stationary metal parts about which it rotates. As a consequence, friction between the inner pipe 10 and the outer column 12 is reduced to a very low value and as a result of the tangential forces developed by the nozzles on the long upper arms 28, the entire spray assembly rotates at extremely high velocity in a counter-clockwise direction. Water, of course, is supplied to the nozzles on arms 26, 27 and 28, directly from the outer column 12.

Because of the fact that the nozzles on the lower arms 26 and 27 are directed tangentially in the direction of rotation, the water discharged from these nozzles travels at extremely high velocity so that dishes placed at the proper angle about the spray mechanism are scoured clean by the action of the moving spray.

Although a spray mechanism constructed as described functions very satisfactorily under ordinary conditions of use, it may be desirable, where there is grit or other solid matter in the water supply, to modify the lower bearing comprising shoulders 13 and 14. In the construction described, the shoulders 13 and 14 form a snug fit about the pipe 10, and any fine particles of solid matter collecting at that point might prevent the free rotation of column 12. To prevent the possibility of such an occurrence, the construction shown in Figure 2 may be employed, in which the upper shoulder 13 is made of greater internal diameter than shoulder 14; and the space therebetween is filled with porous packing material 90. In operation, water containing grit can flow freely past shoulder 13' because of the large clearance between this shoulder and pipe 10' but the grit is filtered out of the water by the packing 90 before it reaches shoulder 14, which fits the pipe 10 snugly.

I claim:

1. In a self-rotating nozzle adapted to be rotated at high speed and comprising a vertical rotatable outer column closed at its upper end and having spray nozzles thereon, a hollow supporting shaft within said column having openings therethrough for supplying water to said column, and a lateral thrust bearing at the lower end of said column and a lateral and end thrust bearing at the upper end of said column, the upper bearing construction comprising an inwardly extending flange on the upper end of said hollow shaft defining a central aperture of smaller diameter than the internal diameter of said shaft, a stub shaft of diameter to fit loosely within said aperture secured to and extending downwardly from the closed upper end of said column through said aperture, and a bearing member mounted on said stub shaft below said aperture for engaging the under edge of said flange and limiting upward movement of said column.

2. A bearing construction as described in claim 1 in which said bearing member mounted on said stub shaft is provided with a conical seat engaging face and in which the lower edge of said flange is provided with a conical seat to receive said conical face on said bearing member.

3. In a self-rotating nozzle adapted to be rotated at high speed and comprising a vertical rotatable outer column closed at its upper end and having spray nozzles thereon, a hollow supporting shaft within said column having openings therethrough for supplying water to said column, and a lateral thrust bearing at the lower end of said column and a lateral and end thrust bearing at the upper end of said column, the upper bearing construction comprising an inwardly extending flange on the upper end of said hollow shaft defining a central aperture of smaller diameter than the internal diameter of said shaft, a stub shaft of diameter to fit loosely within said aperture secured to and extending downwardly from the closed upper end of said column through said aperture, a conical member on said stub shaft and a conical seat on the upper face of said flange for normally engaging said conical member and supporting the weight of said outer column, and a second conical member resiliently supported on the lower end of said stub shaft below said aperture for engaging the under edge of said flange and limiting upward movement of said outer column.

4. In a self-rotating nozzle adapted to be rotated at high speed and comprising a vertical rotatable outer column closed at its upper end and having spray nozzles thereon, a hollow supporting shaft within said column having openings therethrough for supplying water to said column, and a lateral thrust bearing at the lower end of said column and a lateral and end thrust bearing at the upper end of said column, the lower bearing construction which comprises a pair of vertically spaced annular shoulders extending inwardly from the lower end of said outer column into close proximity to said supporting shaft and defining an annular water chamber in free communication with the space surrounding said shaft and column through the clearance space between said shaft and said lower annular shoulder.

5. In a self-rotating nozzle adapted to be rotated at high speed and comprising a vertical rotatable outer column closed at its upper end and having spray nozzles thereon, a hollow supporting shaft within said column having openings therethrough for supplying water to said column, and a lateral thrust bearing at the lower end of said column and a lateral and end thrust bearing at the upper end of said column, the lower bearing construction comprising a pair of vertically spaced annular shoulders extending inwardly from the lower end of said outer column into close proximity to said supporting shaft, said upper annular shoulder being of substantially larger internal diameter than said shaft and the lower shoulder being only very slightly larger than said shaft and a filling of porous filtering material in the annular space between said shoulders and surrounding said shaft whereby small particles of grit present in the water delivered to said device may pass freely between said shaft and said upper shoulder but will be entrapped in said filtering material and thereby prevented from reaching the clearance space between the lower shoulder and shaft.

GEORGE CHESTER WARD, Jr.